March 18, 1952     A. H. LLOYD     2,589,560
ROLLER BEARING
Filed Feb. 12, 1949
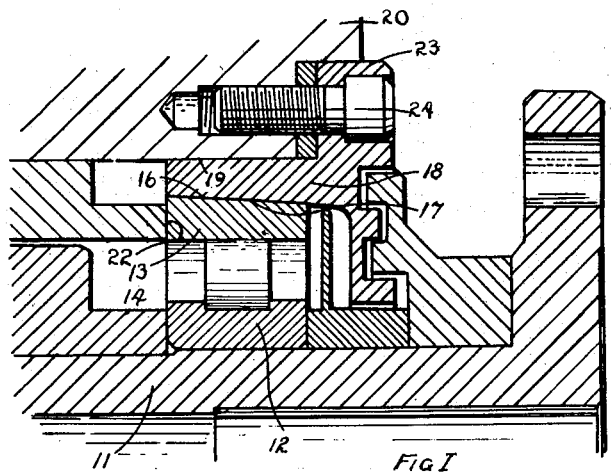
Fig I
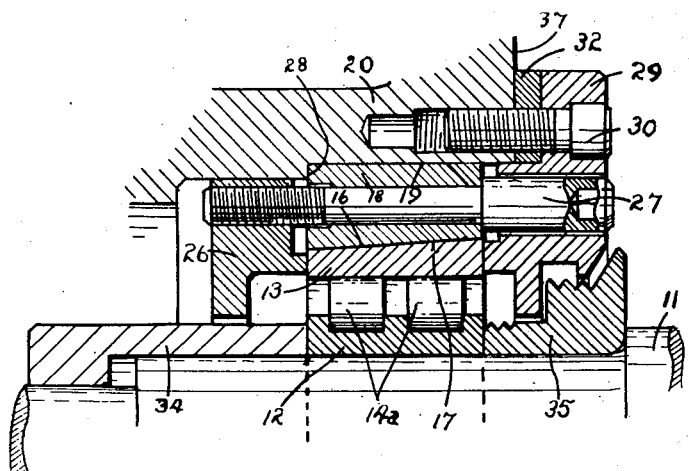
Fig II
INVENTOR.
ARTHUR H. LLOYD
BY
ATTORNEYS.

Patented Mar. 18, 1952

2,589,560

UNITED STATES PATENT OFFICE 2,589,560

ROLLER BEARING

Arthur H. Lloyd, Coventry, England, assignor to Alfred Herbert Limited, Coventry, England Application February 12, 1949, Serial No. 76,117
In Great Britain April 21, 1948

3 Claims. (Cl. 308—207)

1

This invention relates to providing for the accurate support, without radial slackness, of a machine tool spindle or other rotatable member by means of a roller bearing with caged rollers, whereby to avoid vibrations and chattering.

It has previously been proposed to provide the inner race ring of a roller bearing with a tapered bore for coacting with a corresponding conical portion of a machine tool spindle on which the bearing is to be mounted, means being provided for forcing the inner race ring towards the larger diameter end of the conical portion for the purposes of expanding the race ring radially, whereby to control the pre-loading or radial slackness of the bearing.

Such a construction, however, results in a very complicated spindle which is often long and large in diameter, and the adjustment, being on the inner race ring, is not readily accessible.

A particular object of the present invention is to provide for the control of the pre-loading of a caged roller bearing in a simple and readily accessible manner.

A further object is to provide a caged roller bearing of which the inner race ring is fast on the rotatable member while the outer race ring is slightly tapered externally and slidingly engaged with a sleeve or bush the internal periphery of which has the same taper and which is supported externally in a cylindrical bore of a stationary housing, means being provided for effecting relative axial movement between the outer race ring and the bush whereby to compress the outer race ring radially and pre-load the bearing.

Preferably, the rollers are cylindrical ones axially located in the inner race ring, the outer race ring providing a plain race movable axially with respect to the rollers. The arrangement may be such that the outer race ring is axially located against movement in one direction and such that the bush is axially adjustable in the same direction by means coacting with the housing. Preferably, however, the arrangement is such that the bush is axially located against movement in one direction and such that the outer race ring is axially adjustable in the same direction by means coacting with the housing, and is axially adjustable in the opposite direction by means coacting with the bush.

For a better understanding of the objects and advantages of the invention attention should be directed to the following description.

In the accompanying drawings:

Figure 1 is a rather diagrammatic fragmentary

2 sectional elevation of a machine tool spindle supported according to the invention; and Figure 2 is a similar view of a preferred modification.

In the drawings, the spindle is indicated at 11, the inner race ring fast on the spindle at 12, and the outer race ring at 13.

Figure 1 shows a single row of caged rollers 14 and Figure 2 twin rows of caged rollers 14a, the rollers in both cases being axially located in the inner race ring 12. The outer race ring 13, it will be observed, has a plain cylindrical race which is movable axially with respect to the rollers.

In the present instance the outer periphery 16 of the outer race ring is slightly tapered, and it slidingly coacts with a corresponding internal taper 17 of a sleeve or bush 18, the latter having a cylindrical outer periphery supported in a cylindrical bore 19 of a stationary portion 20 of the headstock.

In the construction of Figure 1, the outer race ring 13 is axially located against movement in one direction (i. e., to the left) by engagement with the face 22 of some stationary part of the headstock. The bush 18 is formed integrally with a flange 23 which is shown as being held to the stationary portion 20 by means of a circle of screws 24 (only one screw actually appearing in the drawing). It will thus be evident that, in order to pre-load the bearing and take up radial slackness, it is only necessary to tighten the screws 24, which should, of course, be tightened evenly.

In case in which it may be necessary to dismantle the parts, the modification of Figure 2 is preferred. In this figure an abutment member or back plate 26 is slidably supported, in a bore of the headstock, from the bush 18 by a circle of screws 27. The bush 18 is axially located in one direction (i. e., against movement to the left) by the shoulder 28 at the end of the bore 19 of the headstock. The outer race ring 13 can be forced in the same direction (i. e., to the left) through a clamp plate 29 by screws 30 engaged with the headstock, the clamp plate having through holes to receive the heads of the bolts 27.

In a preferred method of setting up, a washer or adjustment ring, shown at 32, which is in halves to facilitate its insertion, is missing. First the bush 18 and back plate 26, together with the bolts 27, are inserted in the bore in the headstock.

Then the complete bearing, together with the spacer 34, the thrower 35 and the clamp plate 29, are assembled on the spindle. After the spindle assembly has been inserted in the housing, the screws 30 are tightened as evenly as possible until the amount of lift or radial slackness at the spindle end is reduced to approximately 0.0002". Then the space, shown as being occupied by the ring 32, between the face 37 of the headstock and the clamp plate 29, should be checked all the way round to make sure that it is of constant width, and if not the screws 30 should be adjusted until the space is of constant width. This constant width is then measured, and an adjustment ring 32 (which, as stated, is formed in halves—i. e., of two semi-circular portions) is then selected or formed to be of a width less than the measured width of the space by approximately 0.005". Thereupon this adjustment ring is inserted in position, for which purpose the screws 30 are removed and then reinserted through clearance holes provided in the adjustment ring. The screws 30 are then tightened to force the clamping plate against the adjustment ring, thus pre-loading the rollers to a predetermined extent. Finally the bolts 27 are tightened to bring the back plate 26 up against the left-hand end of the outer race ring.

When it is desired to dismantle, the pre-load on the bearing is reduced by slackening the screws 30 slightly and tightening the bolts 27, which serves for forcing the outer race ring 13 axially (to the right) relatively to the rollers, this freeing the grip between the conical surfaces 16 and 17.

Obviously, if preferred, the rollers 14 could be axially located in the outer race ring, to be able to move axially in unison with the outer race ring relatively to the inner race, which would be a plain cylindrical one.

What I claim as my invention and desire to secure by Letters Patent of the United States is:

1. In combination, a stationary housing, a rotatable member, a roller bearing including a plurality of caged rollers operating between plain races provided by non-split inner and outer rings, one of said race rings being movable axially relatively to said rollers, said inner race ring being fast on said rotatable member, said outer race ring being slightly tapered externally, a bush the internal periphery of which has the same taper as that of said outer race ring and is slidingly engaged by said outer race ring, said bush being supported externally in a cylindrical bore of said stationary housing and axially located thereby against movement in one direction, means for effecting axial movement of said outer race ring in said one direction whereby to compress said outer race ring radially and pre-load said bearing, and means carried by said bush for moving said outer race ring relatively to said bush in the other direction to remove the loading on said bearing.

2. The combination of claim 1 in which said first-mentioned means includes a plurality of screws engaged in said housing, said screws having heads engaged with a clamp plate acting axially on said outer race ring.

3. The combination of claim 2, including an axially-sized washer disposed between said clamp plate and housing.

ARTHUR H. LLOYD.

REFERENCES CITED

The following references are of record in the file of this patent:

UNITED STATES PATENTS

| Number | Name | Date |
|---|---|---|
| 488,697 | Parenteau | Dec. 27, 1892 |
| 748,825 | Webb | Jan. 5, 1904 |
| 1,206,505 | Blume | Nov. 28, 1916 |
| 1,222,833 | Wills | Apr. 17, 1917 |

FOREIGN PATENTS

| Number | Country | Date |
|---|---|---|
| 509,315 | Germany | Oct. 8, 1930 |